June 13, 1961  H. BRETTHAUER ET AL  2,987,977
PLURAL RANGE MASKING MEANS FOR PHOTOGRAPHIC
MEASURING INSTRUMENTS
Original Filed May 7, 1957  2 Sheets-Sheet 1
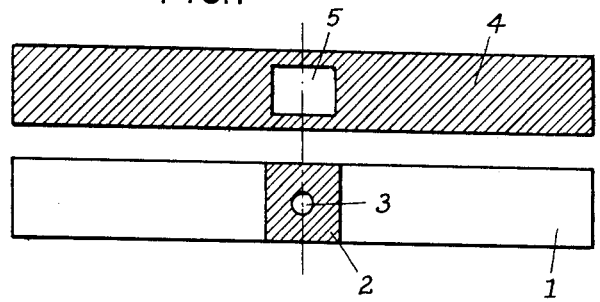
FIG.1
FIG.1A
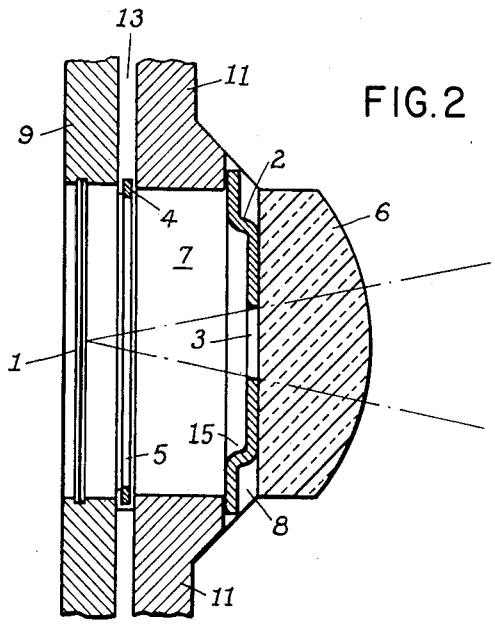
FIG.2

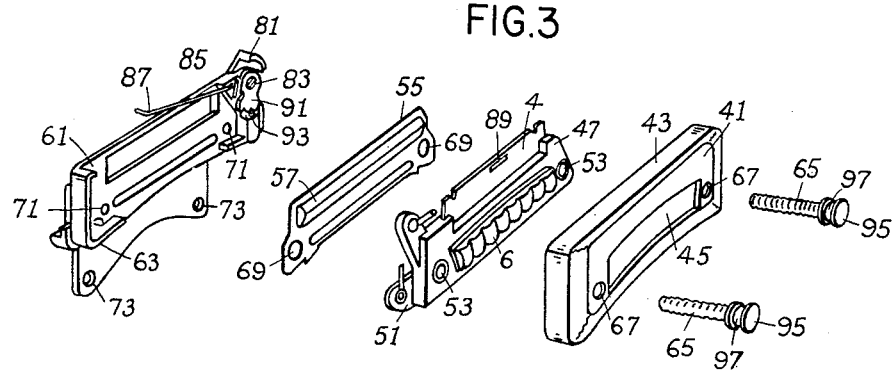
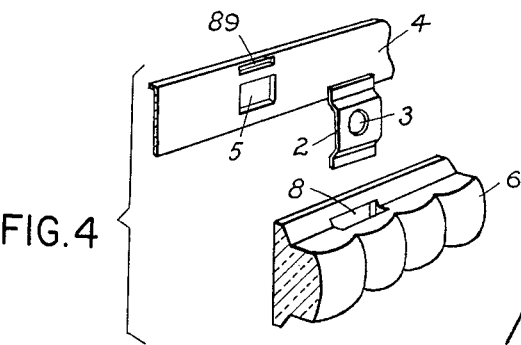
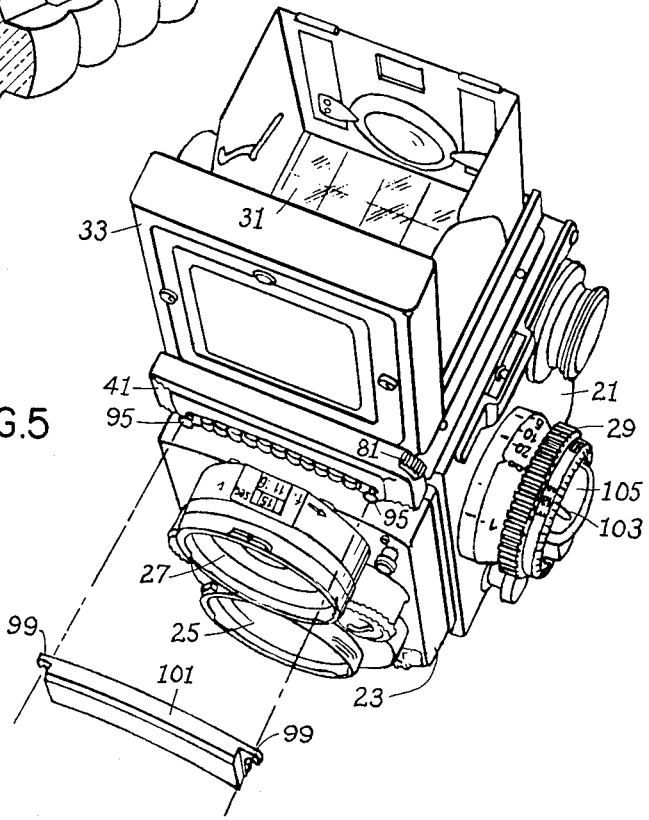

United States Patent Office 2,987,977
Patented June 13, 1961

2,987,977
PLURAL RANGE MASKING MEANS FOR PHOTOGRAPHIC MEASURING INSTRUMENTS
Hermann Bretthauer and Joachim Mädge, Braunschweig, and Wolf Kröger, Erlangen, Germany, assignors to Franke & Heidecke, Fabrik Photographischer Prazisions-Apparate, Braunschweig, Germany, a German firm
Original application May 7, 1957, Ser. No. 657,552, now Patent No. 2,926,562, dated Mar. 1, 1960. Divided and this application Oct. 7, 1959, Ser. No. 846,227
Claims priority, application Germany May 11, 1956
4 Claims. (Cl. 95—10)

This invention relates to a photoelectric instrument, such for example as a so-called exposure meter for photographic purposes, and especially one having a plurality of ranges of sensitivity.

The total range of sensitivity which is desirable for an exposure meter for photographic purposes, cannot be covered by a photoelectric cell having only a single range, if a reasonably high degree of accuracy for readings throughout the total range of brightness variations is desired. Therefore, it is customary to vary the intensity of the light incident upon the photocell, by mechanical means, in order to provide two or more ranges of sensitivity of the photocell, all of the available light being allowed to fall on the photocell when the available light is rather low and when the photocell should have its maximum sensitivity range, and only part of the available light being allowed to fall on the photocell when the available light is rather bright or intense, thus providing a range of reduced sensitivity.

An object of the invention is the provision of a generally improved and more satisfactory construction of this kind.

Another object is the provision of means for varying the amount of available light falling on the photocell, in such manner that the angular range or field of view of the light meter remains approximately the same for all ranges of sensitivity of the photocell.

Still another object is the provision of light varying means of a particularly simple and inexpensive form.

A further object is the provision of light varying means in a form particularly unlikely to be affected by dirt.

A still further object is the provision of an exposure meter photocell structure particularly suitable for mounting on a camera where, because of the interior construction of the camera, the photocell of the exposure meter must project forwardly from the front wall of the camera instead of being mounted within the camera body.

These and other desirable objects may be attained in the manner disclosed as an illustrative embodiment of the invention in the following description and in the accompanying drawings forming a part hereof, in which:

FIG. 1 is a face view of a movable shutter or mask for cutting down the light incident on the photocell, according to the present invention;

FIG. 1A is a similar view of a fixed diaphragm or mask which cooperates with the movable shutter of FIG. 1 to accomplish the desired result;

FIG. 2 is a longitudinal section taken vertically through a preferred form of the invention;

FIG. 3 is an exploded perspective view of the photoelectric cell and its mounting and control parts;

FIG. 4 is an exploded perspective view of a portion thereof, on a larger scale; and FIG. 5 is a perspective view of a camera equipped with an exposure meter having a photocell in accordance with the present invention.

The same reference numerals throughout the several views indicate the same parts.

If an exposure meter is to have a plurality of ranges, it is desirable that two successive ranges should follow each other immediately, without any gap between them and usually without any substantial degree of overlap. That is, for example, if the more sensitive range of the light meter is to cover various intensities of relatively dim light, and the less sensitive range of the meter is to cover various intensities of brighter light, it is desirable in most cases that the brightest end of the scale of the dim range should correspond approximately to the dimmest end of the scale of the brighter range. While this theoretical relationship is subject to a certain amount of deviation as a practical matter, nevertheless the functioning of the meter should approach this theoretical relationship to a substantial degree.

To accomplish this, it is sometimes necessary to cut down the amount of light incident on the meter to a very great extent, when using the brighter range of the meter. For instance, if each range of the meter is to cover light variations extending all the way from camera diaphragm stop $f{:}2.8$ to diaphragm stop $f{:}22$, and if the low end of the scale in one sensitivity range is to be equal to the high end of the scale in the other sensitivity range, the available light falling on the photocell in the low sensitivity or bright light range should be only about $\frac{1}{62}$ of the light falling on the photocell in the dim light or high sensitivity range.

If this is accomplished by placing a shutter or mask in front of the photocell when converting it to the low sensitivity or bright light range, it is apparent that the opening in the diaphragm or shutter must be extremely small, and must block out all but about $\frac{1}{62}$ of the light which would fall on the photocell when the shutter or mask is in its ineffective position. Of course the proportion or fraction would be different if the light meter were designed to cover a different range of diaphragm stops of the photographic camera, but the above example shows that the hole in the shutter employed to convert the photocell from high sensitivity range to low sensitivity range would in any event have to be quite small. Such a small hole in a movable shutter member has the disadvantage that it is likely to become clogged by dirt, the movements of the shutter member from one position to another making it relatively easy for stray dirt to be picked up. Moreover, there is danger that when the shutter is placed in its effective position to cut down the sensitivity of the light meter, it may not be exactly centered in the desired position, with the consequence that the angle of view or picture angle of the light meter will be unintentionally altered, whereas it should remain the same when measuring the light in both ranges of sensitivity.

These disadvantages are overcome according to the present invention, by using two separate shutter elements or masks cooperating with each other in combination, one shutter element remaining stationary in normal use, and the other one being movable. According to this invention, the normally stationary shutter element contains the relatively small hole, and is carefully mounted in such a position that it will not adversely affect the field of view or picture angle. The fact that this shutter is not normally movable means that it is less likely to pick up dirt which might be carried into the small opening of the shutter element by movement thereof, and also it can be completely sealed in the instrument to prevent access of dirt. The movable shutter element, according to the present invention, has a much larger hole, so that it is not likely to retain any dirt which may reach this shutter element during the operational movements thereof.

Referring now to the drawings and first to FIG. 1A, the area of the effective light-receiving surface of the photoelectric element or photocell is indicated by the rectangle 1. A small part of the area of this photocell, preferably but not necessarily at the center thereof, is covered by the fixed shutter or mask 2 which is opaque except for a small light transmitting aperture 3 having the desired very small area as compared with the total area of the entire photocell. The stationary shutter 2 is of considerably larger area than the small opening 3, but covers only a small part or minor fractional part of the entire area of the photocell 1; for example, only the area of one of the usual honeycomb light passages customarily arranged in front of the photocell to control the angular field of view of the cell. Usually there are at least seven or eight of these honeycomb passages, or often more, so that if the stationary mask extends across only one of the passages, its area would be not more than about 1/7 or 1/8 of the total area of the photocell.

Cooperating with this stationary shutter 2 is the movable shutter or mask 4, shown in FIG. 1. This movable shutter is of at least the same area as the photocell 1 (it can be larger, if desired) and is opaque throughout its area except for an aperture 5 slightly smaller than the area of the shutter 2, and much larger than the area of the opening 3 in the shutter 2.

When the light meter is to be used in the dim light or high sensitivity range, the movable shutter 4 is moved entirely out of alinement with the photocell 1, and does not obstruct any of the light falling on the photocell. Therefore, the entire area of the photocell receives light, except for the relatively small amount of light cut off by the stationary shutter 2. When the photocell is to be used in the low sensitivity or bright light range, the movable shutter 4 is moved to a position in front of the photocell 1, with the aperture 5 alined with the mask 2, so that it cuts off all light except what can pass thorugh the opening 5, which in turn is dependent on the size of the opening 3 in the fixed shutter 2. Since the opening 5 is considerably larger than the opening 3, it is not likely to become clogged by dirt notwithstanding the fact that the shutter 4 is movable and thus might otherwise pick up stray dirt during its movements if the opening therein were extremely small.

In the preferred construction the photoelectric cell 1 is mounted in an apertured mounting plate 9 and extends behind the usual honeycomb arrangement which limits the field of view or picture area from which light may reach the cell. This honeycomb arrangement usually includes a number of separate lens elements 6, arranged in a row in side by side relation to each other, and spaced forwardly from the photocell by means of an intermediate plate 11 provided with the honeycomb light tunnels or light passages 7 which, in combination with the lenses 6 (one in front of each passage 7) constitute the honeycomb assembly for controlling the angular extent of view.

As the front of the plate 11, between it and one of the honeycomb lenses 6 (preferably but not necessarily the central lens of the row) there is a slot or groove 8 for receiving the interchangeable but normally stationary shutter or mask member 2 which has the small opening 3 previously mentioned. This mask 2 lies as close as possible to its particular one of the honeycomb lenses 6, preferably in contact with the rear face of this lens, so that it does not appreciably change the picture angle or field of view.

Another slot 13, between the plate 9 and the plate 11, preferably receives the movable shutter or mask 4 which is displaceable to and from effective position either endwise or sidewise or by a pivotal swinging movement or in any other desired direction. Rearward spacing of the movable mask from the lens 6 is not detrimental, as it does not affect the angular field of view. However, if desired, the movable mask 4 may be placed directly behind the mask 2 and in front of the plate 11.

When the light meter is to be used in its most sensitive range, the shutter 4 is displaced so that it is out of alinement with all of the honeycomb passages 7, and all the available light (coming from points within the angular field of view or picture field of the device) reaches the photocell 1, except the relatively small part of light cut off by the fixed shutter or mask 2. When the light meter is to be used in the range of less sensitivity, the shutter or mask 4 is placed in its effective position extending in line with the row of honeycomb passages 7 and honeycomb lenses 6, so as to cut off all the light except that which comes through the opening 5 which is alined with the fixed mask 2, so that the photocell now receives only the amount of light permitted to pass through the small control opening 3.

The mask 2 with the small opening 3 has been described as a fixed or stationary mask, and this is true in normal operation, but preferably this mask is made removable so that it may be taken out occasionally for necessary cleaning, or may be taken out and replaced by another mask with a hole 3 of a different size, to adjust the sensitivity of the photocell.

The stationary mask 2 preferably has its top and bottom edges (when seen as in FIG. 2) offset from the plane of the central part of the mask, so as to provide a slot 15 behind the main part of the mask 2. This slot may receive a supplementary slide insertable and removable for the purpose of further cutting down the effective size of the aperture 3, to produce one or more additional ranges of sensitivity.

This arrangement is applicable either to a light meter built into a photographic camera, or to a separate light meter to be carried in the hand. Also it is apparent that by using different masking slides, the photocell may be adjusted to three or more different ranges of sensitivity, rather than merely two ranges.

The foregoing description has explained the optical principles of the present invention, mainly with reference to FIGS. 1, 1A, 2, and 4. Specific constructional details of a form of the invention suitable for use on a twin lens reflex camera will now be described with reference to FIGS. 3 and 5.

In these views, there is shown a form of the invention intended particularly but not exclusively for use on a twin lens reflex camera of the kind identified by the trademark "Rolleiflex," manufactured by the firm of Franke & Heidecke, of Braunschweig, Germany, and widely known and used in the United States of America and elsewhere. The following description presupposes general familiarity with this camera in the form in which it is currently available in the United States. Those who are not already familiar with the general constructional features of this camera may obtain further information by consulting the reference book "Rollei Photography; Handbook of the Rolleiflex and Rolleicord Cameras" by Jacob Deschin, published in 1952 by Camera Craft Publishing Company, of San Francisco, California.

The camera body is shown in general at 21. At the front of the body is the usual movable front member or lens board 23 carrying the lower or picture taking lens 25 and the upper or finder lens 27, both moving bodily with the front member 23 when the latter is moved forwardly and backwardly in the direction of the optical axis by appropriate rotation of the focusing knob 29 mounted on the left side wall of the camera. Light entering through the picture taking lens 25 (when the shutter is opened to make an exposure) falls on the film within the film chamber of the camera. Light entering through the finder lens 27 is reflected upwardly onto a horizontal focusing screen or viewing screen 31 at the top of the camera, which focusing screen is surrounded by a collapsible focusing hood or shadow box composed of various folding walls including a wall 33 which forms the front wall of the hood in its erected position and which falls down over the other walls and forms a top or cover for them, when the hood is in its collapsed position. For a typical form of the hood structure, see Bretthauer Patent 2,641,955, granted June 16, 1953.

Due to the interior construction of a camera of this kind, there is no convenient place in which the photocell of a light meter can be set into the camera body. However, the photocell arrangement of the present invention is well suited to a camera of this kind, as it can be conveniently mounted on and project forwardly from the top of the stationary front wall of the camera, above the movable front member or lens carrying member 23, and approximately at or below the hinge at the bottom of the front wall 33 of the collapsible hood.

In this form of the invention, the photocell structure includes a main front plate 41 having rearwardly extending marginal flanges 43 and having an aperture 45 elongated in a lateral direction, in which aperture there is mounted the honeycomb lens 6 previously described. In the honeycomb lens 6 there is a slot or recess 8 behind one individual lens portion, which slot receives the stationary mask 2 having the stationary opening 3 as previously described. The other individual lens portions of the honeycomb have no such recesses or masks. The honeycomb lens 6 is secured to a frame plate or support plate 47 which has a vertical guideway or groove in which the shutter member 4 slides upwardly and downwardly. The photoelectric material 51 extends across the frame member 47 behind the honeycomb lens 6 and in a plane behind the shutter 4, this photoelectric material being held in fixed position relative to the frame member 47 by means of the hollow rivets 53.

A spring pressure plate 55 is placed behind the members 47 and 51, and has a resilient rib 57 pressing lightly forwardly against the rear face of the movable shutter 4, to hold the shutter frictionally in any of its two positions in which it is set and to tend to urge the photocell assembly forwardly into seating contact with the plate 41.

When the parts are assembled from the exploded position shown in FIG. 3 to the normal assembled position, the parts 47, 51, 55 are located within a small housing formed by a plate 61 having forwardly extending marginal flanges 63 which telescope snugly inside the rearwardly extending marginal flanges 43 of the front plate 41. The parts are all held together in assembled relation by two screws 65 which have heads pressing rearwardly against the front face of the front plate 41, and which have threaded shanks extending rearwardly through holes 67 in the plate 41, through the hollow rivets 53, through alined holes 69 in the spring pressure plate 55, and are screwed into tapped holes 71 in the base plate or housing plate 61. Preferably these screws extend further rearwardly into tapped openings in the front wall of the camera body 21, to hold the photoelectric cell assembly in place on the camera body, and it may be additionally held thereon by other screws extending through holes 73 at the lower corners of the plate 61, just above the top of the movable lens board or front member 23 of the camera.

The shifting of the photocell from one sensitivity range to another sensitivity range, in accordance with the optical principles previously discussed in conjunction with FIGS. 1, 1A, 2, and 4, is done manually by suitable means such as a fingerpiece 81 pivotally mounted on the pivot 83 on the plate 61, and having a radially extending spring arm 85 secured to the fingerpiece 81 to swing therewith. This arm 85 extends to a position near the center line of the camera, where it has a rearwardly bent end 87 engaging in a horizontal slot 89 in the shutter member 4, so that as the end of the arm 85 swings upwardly and downwardly (upon movement of the fingerpiece 81) the end 87 thereof engaging in the slot 89 will cause corresponding upward or downward movement of the shutter member 4. In its downward position, the shutter 4 prevents light from reaching the photoelectric material except through the opening 3 in the mask 2. In its upper position, light passing through all of the individual honeycomb lens units may reach the photoelectric material 51.

A small detent arm 91 may be fastened to the fingerpiece 81 to turn therewith, the detent arm 91 having an arcuate end concentric with the pivot 83, and two notches in this arcuate end to engage with a resilient spring member 93 to hold the fingerpiece frictionally or resiliently in either one of its two extreme positions, with the shutter up in non-obstructing relation to all of the honeycomb lens elements 6 (the position for maximum sensitivity of the photocell, in dim light) or with the shutter in the down position blocking light from all but one of the honeycomb lens elements (the position for lower sensitivity, in more brilliant light).

In order to adapt the light meter to use as an incident light meter, and to provide a mounting for a protective plate when desired, the heads 95 of the meter attaching screws 65 are provided with peripheral grooves 97 for engaging and removably retaining the lateral lugs 99 on a supplementary member 101, which supplementary member may be a plain protective covering cap, or may be a diffuser which will convert the light meter to an incident type of meter when the diffuser is held in place in front of the honeycomb lens 6.

The photoelectric cell, having the construction described above, is connected by suitable electric circuit wires to the indicating part of the exposure meter, which indicating part has the usual movable pointer or hand 103, preferably mounted in a small housing or chamber 105 projecting from the end of the focusing knob 29. The construction and location of the indicating instrument are not part of the present invention, but are claimed in the copending United States patent applications of Karl Rander, Serial No. 633,881, filed January 14, 1957 (now Patent 2,909,108, granted October 20, 1959), and of Karl Rander and Fritz Falkenburg, Serial No. 641,727, filed February 21, 1957 (now Patent 2,937,568, granted May 24, 1960).

The present application is a division of our parent application, Serial No. 657,552, filed May 7, 1957 (now Patent 2,926,562, granted March 1, 1960). The parent application, in turn, is a continuation in part of the copending United States patent application of the same applicants, Serial No. 627,765, filed December 12, 1956 (now abandoned).

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. The combination with a photographic camera body having an upright stationary front wall and a movable lens carrier covering the major part of the front face outline of said front wall and leaving exposed a horizontally elongated area of said front wall above the top of said lens carrier, of a photocell assembly mounted on and projecting forwardly from said area of said front wall, said photocell assembly comprising a photoelectric member elongated horizontally, a honeycomb lens member also elongated horizontally and lying in front of said photoelectric member so that said photoelectric member may receive light passing rearwardly through individual lens portions of said honeycomb lens member, an apertured masking member located behind only one of said individual lens portions for obstructing all passage of light from said one of said lens portions to said photoelectric member, except such light as may pass through the aperture in said masking member, said masking member being in non-obstructing relation to light passing through others of said lens portions, a shutter movable between an ineffective position and an effective light-obstructing position between said honeycomb lens member and said photoelectric member, said shutter having an aperture alined with the aperture in said masking member when said shutter is in its effective position and serving when in said position to obstruct passage to said photoelectric member of substantially all light except such light as passes through the alined apertures in said masking member and said shutter, a pivoted lever mounted on said camera body to be externally accessible for manual oscillation, a detent device coupled with said lever for holding it releasably in one of two positions, and an arm on said lever engaging said shutter to move said shutter from its effective position to its ineffective position when said lever is moved from one of its positions to the other.

2. The combination with a photographic camera body having an upright stationary front wall and a movable lens carrier covering the major part of the front face outline of said front wall and leaving exposed a horizontally elongated area of said front wall above the top of said lens carrier, of a photocell assembly mounted on and projecting forwardly from said area of said front wall, said photocell assembly comprising a horizontally elongated frame member on which are mounted an elongated honeycomb lens and a photoelectric member spaced therebehind, means defining a slot at the rear of only one individual lens portion of said honeycomb lens for receiving a small normally stationary but interchangeable mask having a relatively small light admitting aperture, said frame member further having a vertical guideway between said honeycomb lens and photoelectric member for receiving a shutter having an aperture which is alined with the aperture in said stationary mask when said shutter is in an effective position blocking light to all other portions of said photoelectric member except that which comes through the alined apertures, said shutter being movable to an ineffective unblocking position, a front plate and a rear housing plate within which said frame member and associated parts is enclosed, said front plate having a horizontal elongated aperture for admitting light to said honeycomb lens, and manually operable means projecting from one side of said rear housing plate for moving said shutter between said effective and ineffective positions.

3. A construction as defined in claim 2, further including a spring pressure plate located between said frame member and rear housing plate and having a horizontal resilient rib pressing against said shutter to hold said shutter frictionally in either its effective or ineffective position.

4. A construction as defined in claim 2, wherein said manually operable means for moving said shutter includes a fingerpiece pivoted to said rear plate and having a radial spring arm, said spring arm being coupled with said shutter to raise and lower said shutter as said fingerpiece is operated, and detent means for resiliently holding said fingerpiece in either of two positions corresponding to the two positions of said shutter.

References Cited in the file of this patent
UNITED STATES PATENTS

| | | |
|---|---|---|
| 2,043,901 | Mihalyi | June 9, 1936 |
| 2,080,055 | Martin | May 11, 1937 |
| 2,373,391 | Green | Apr. 10, 1945 |